US006944106B2

(12) United States Patent
Suzuki

(10) Patent No.: US 6,944,106 B2
(45) Date of Patent: Sep. 13, 2005

(54) INFORMATION RECORDING APPARATUS FOR CONTROLLING RECORDING POWER OF A RECORDING MEDIUM

(75) Inventor: Haruyuki Suzuki, Kanagawa (JP)

(73) Assignee: Ricoh Company, Inc., Tokyo (JP)

( * ) Notice: Subject to any disclaimer, the term of this patent is extended or adjusted under 35 U.S.C. 154(b) by 452 days.

(21) Appl. No.: 10/237,601

(22) Filed: Sep. 10, 2002

(65) Prior Publication Data

US 2003/0048713 A1 Mar. 13, 2003

(30) Foreign Application Priority Data

Sep. 12, 2001 (JP) ....................................... 2001-276916

(51) Int. Cl.[7] ................................................ G11B 7/00

(52) U.S. Cl. ................. 369/47.53; 369/116; 369/53.26; 369/53.3

(58) Field of Search ........................... 369/47.53, 47.39, 369/47.37, 53.27, 47.28, 53.37, 53.3, 53.26, 116

(56) References Cited

U.S. PATENT DOCUMENTS

| | | | |
|---|---|---|---|
| 5,097,458 A | 3/1992 | Suzuki | |
| 5,218,588 A | 6/1993 | Suzuki | |
| 5,222,057 A | 6/1993 | Suzuki et al. | |
| 5,309,418 A | 5/1994 | Suzuki | |
| 5,371,726 A | 12/1994 | Suzuki | |
| 5,375,108 A | 12/1994 | Suzuki | |
| 5,442,607 A | 8/1995 | Suzuki | |
| 5,487,055 A | 1/1996 | Suzuki | |
| 5,521,892 A | 5/1996 | Suzuki | |
| 5,604,722 A | 2/1997 | Suzuki | |
| 5,631,886 A | 5/1997 | Suzuki | |
| 6,128,261 A | 10/2000 | Suzuki | |
| 6,333,903 B1 | 12/2001 | Suzuki | |
| 6,418,102 B1 * | 7/2002 | Suga | 369/47.53 |
| 6,442,115 B1 * | 8/2002 | Shimoda et al. | 369/47.28 |
| 6,504,806 B1 * | 1/2003 | Nakajo | 369/59.12 |
| 6,512,652 B1 * | 1/2003 | Nelson et al. | 360/78.01 |
| 6,628,595 B1 * | 9/2003 | Sasa et al. | 369/59.12 |
| 6,842,412 B2 * | 1/2005 | Ushiyama et al. | 369/47.53 |
| 2002/0012296 A1 | 1/2002 | Suzuki | |
| 2002/0012297 A1 | 1/2002 | Suzuki | |
| 2002/0044507 A1 | 4/2002 | Hagiwara et al. | |
| 2002/0063943 A1 | 5/2002 | Matsui | |

* cited by examiner

*Primary Examiner*—W. R. Young
*Assistant Examiner*—Van Pham
(74) *Attorney, Agent, or Firm*—Dickstein Shapiro Morin & Oshinsky LLP

(57) ABSTRACT

An information recording apparatus that records information with a substantially constant linear density in a circumferential direction of a recording medium having a disk shape, includes variable velocity recording control means, recording power modification means, recording power storage means, and initial recording power value setting means.

10 Claims, 5 Drawing Sheets

FIG.2

| LINEAR VELOCITY | RECORDING POWER |
| --- | --- |
| 12× | |
| 13× | 18mW |
| 14× | |
| 15× | |
| 16× | 24mW |
| 17× | |
| 18× | |
| 19× | |
| 20× | |

INFORMATION RECORDING APPARATUS FOR CONTROLLING RECORDING POWER OF A RECORDING MEDIUM

BACKGROUND OF THE INVENTION

1. Field of the Invention

The present invention generally relates to an information recording apparatus, an information recording method, an information recording program, a recording medium that can be read and written to by a computer, and circuit parts, suitable for controlling recording power of a recording medium having a constant linear density such as a CD-R (Compact Disk Recordable).

2. Description of the Related Art

There is a CD-R (Compact Disk Recordable) used as a disk-type recording medium with a constant linear velocity Conventionally, the CD-R is revolved at a constant linear velocity (CLV) to record data thereon. In this case, the relative velocity between the disk-type recording medium and a laser beam is always constant; therefore, once recording conditions such as recording power and recording pulse width are set optimally, these recording conditions do not need to be changed throughout the surface of the disk.

Therefore, normally, test-writing is performed in a specific area at the innermost periphery of the disk, with varying recording power, with which power a recording can be performed at an equal linear velocity throughout the surface of the disk without causing any problem.

However, in the CLV method, as the recording is performed nearer the inner periphery, the revolution rate of the disk needs to be made faster, i.e., the angular velocity of the disk needs to be made higher, making it difficult to revolve the disk at such a high speed. This leads to a higher cost of a drive motor and an increase in noise and vibration; it also becomes difficult to design other servo systems.

Thereupon, several measures have been taken, in which the angular velocity is not made very low at the outer periphery, while the angular velocity is not made so high at the inner periphery. In this case, the linear velocity becomes higher nearer the outer periphery. Hence, a zone constant linear velocity (ZCLV) method, in which a plurality of recording zones are allocated in a face of the disk so that the CLV is applied to the inner periphery and a higher linear velocity is applied to the outer periphery, is applied. Furthermore, there is a constant angular velocity (CAV) method in which the angular velocity of the disk is constant. In the case of CAV, the linear velocity becomes higher nearer the outer periphery.

In any of the above-mentioned measures, the angular velocity at the inner periphery is not made high; therefore, in some cases, a recording is performed at a linear velocity different from the linear velocity at the inner periphery in which test-writing is performed.

In these cases, how to set or arrange the recording power and other recording conditions is a matter of concern.

Accordingly, an apparatus in which a predetermined operation is carried out as a result of the test-writing so that recording conditions of the different linear velocities can be calculated, was developed conventionally. Furthermore, an apparatus to which the following method is applied, was also developed. That is, an objective value in a predetermined recording state and a value corresponding to a regeneration signal from the recording medium are compared so that a recording power is modified based on a result of the comparison during the time that the information is being recorded to the recording medium. The method is called a running OPC since power is modified in real time during the recording in a case where the test-writing is called Optimum Power Control (OPC). It is possible to modify the proper recording power suitably by applying the running OPC in order to prevent the recording sensitivity from being changed based on a change of media sensitivity and a change of wavelength of a light source.

However, there are two methods for recording information. One is a method in which an entire disk is recorded at once. The other is a method in which the information is recorded with a shorter recording unit many times. The latter method is applied relatively frequently. In this case, after the information recording is discontinued, selecting the following recording power to restart recording is a problem.

Conventionally, a value modified the recording power determined by the OPC so as to correspond to a recording linear velocity, which was then used as the restart recording power. However, before the recording is stopped, as a matter of fact, it had already been expected that the recording power would be modified. After the recording is restarted, the running OPC is activated again. It takes some time to modify the proper power. Before the recording power is modified to the proper power, the recording is implemented with an improper power so that recording quality is reduced and thereby an error may occur.

Therefore, it was necessary to set up an initial value of the following recording power so as to have a nearly proper power from the beginning of the time of restarting the recording. In addition, it was necessary to modify the following change of the recording power by the running OPC.

It becomes more difficult to determine the initial value of the recording power in a case where the recording linear velocity is different depending on the radius of the disk, such as CAV or ZCLV. If the initial value of the recording power is calculated based on only the determination value of the OPC, the initial value of the recording power will be different from an amount of modification by the running OPC.

SUMMARY OF THE INVENTION

Accordingly, it is a general object of the present invention to provide a novel and useful information recording-apparatus for controlling recording power of a recording medium having a constant linear density in which the problems described above are eliminated.

Another and more specific object of the present invention is to provide an information recording apparatus wherein the initial value of the recording power is obtained at the time of restarting recording based on the result of the modification of the recording power in a just-prior state of stopping recording. Because of this, in a case of a short recording unit or the CAV or ZCLV recording, the proper initial value of the recording power is obtained so that the recording quality is not reduced even partially.

The above objects of the present invention are achieved by an information recording apparatus that records information with a substantially constant linear density in a circumferential direction of a recording medium having a disk shape, including variable velocity recording control means for recording the information by a different linear velocity in a radial direction of the recording medium; recording power modification means for comparing a predetermined objective value of a recording state with a value corresponding to a generation signal from the recording medium and modifying a recording power value based on a result of the comparison if necessary, while the information is being recorded to the recording medium; recording power storage means for storing the recording power value just-before stopping recording that is modified by the recording power modification means, with reference to the linear velocity, when recording is stopped; and initial recording power value setting means for setting an initial value of the recording power of the recording power modification means based on the linear velocity and the recording power value stored by the recording power storage means.

According to the present invention, it is possible to obtain the initial value of the recording power at the time of restarting recording by using a result based on a modification of the power just-before stopping recording. Therefore, it is possible to record with proper power from the time of starting recording so that it is possible to secure a good recording quality at all areas. Furthermore, even if the respective linear velocities are different in a disk surface like the CAV, it is possible to obtain the initial value of the recording power at the time of restarting recording by referring to the power value saved at the recording power storage means so as to correspond to the linear velocity. Hence, it is possible to secure a proper recording quality despite recording with a high velocity.

The initial recording power value setting means, at a time of recording being restarted, in a case where a recording power with reference to substantially equal linear velocity to a recording linear velocity is stored at the recording power storage means, may set the recording power as an initial value, and in a case where the recording power with reference to substantially equal linear velocity to the recording linear velocity is not stored but a recording power with reference to a different linear velocity than the recording linear velocity is stored at the recording power storage means, may calculate and set an initial value of the recording power by carrying out a predetermined operation with the recording power stored at the recording power storage means and the recording linear velocity through recording power calculation means.

According to the present invention, even if recording is restarted at a different position than the position where recording is stopped, it is possible to calculate the initial value of the proper recording power. Hence, there is no bad influence on the recording quality.

The recording power calculation means may calculate a recording power $P_{w3}$ by carrying out an operation of $P_{w3}=(V_3/V_2)\times P_{w2}$ where the recording power with reference to the recording linear velocity V2 stored at the recording power storage means is defined as $P_{w2}$ and a linear velocity at the time of starting recording is defined as $V_3$, and provides the recording power $P_{w3}$ to the initial recording power value setting means.

According to the present invention, the initial value of the proper recording power is calculated by the recording power calculation means and provided to the initial value of recording power setting means.

The information recording apparatus, may further include a test-writing control means for implementing test-writing at a predetermined recording linear velocity so that a proper recording power corresponding to the recording linear velocity is obtained, and wherein the initial value of the recording power setting means, at the time of recording being restarted, in a case where the recording power with reference to substantially equal linear velocity to the recording linear velocity is not stored at the recording power storage means, may set an initial value of the recording power calculated by carrying out a predetermined operation with the proper recording power obtained by the test-writing control means and the linear velocity at the time of restarting recording, through the recording power calculation means.

According to the present invention, it is possible to obtain the initial value of the substantially proper recording power value even in a case of first time recording. Hence, it is possible to maintain good recording quality.

The initial recording power value setting means may set an initial value of the recording power calculated by carrying out a predetermined operation with the proper recording power obtained by the test-writing control means and the linear velocity at the time of restarting recording, through the recording power calculation means, in a case where a radius position at the time of restarting recording is in a range of the predetermined distance from a position where test-writing is implemented by the test-writing control means.

According to the present invention, it is possible to apply proper recording power even in a case where recording is stopped at a position apart from the test-writing area and recording is restarted at a position close to the position apart from the test-writing area. Hence, it is possible to further maintain the good recording quality.

The recording power calculation means may calculate a recording power $P_{w1}$ by carrying out an operation of $P_{w1}=(V_1/V_0)\times P_{w0}$ where a proper recording power obtained by the test-writing control means is defined as $P_{w0}$ and a linear velocity at the time of restarting recording is defined as $V_1$, and provides the recording power $P_{w1}$ to the initial recording power value setting means.

According to the present invention, it is possible to calculate and set the initial value of the proper recording power. Hence, it is possible to obtain the initial value of the substantially proper recording power even in a case of the first time recording. Because of this, it is possible to maintain the good recording quality. Furthermore, it is possible to apply proper recording power even in a case where recording is stopped at a position apart from the test-writing area and recording is restarted at a position close to the position apart from the test-writing area. Hence, it is possible to further maintain good recording quality.

Other objects and further features of the present invention will be apparent from the following detailed description when read in conjunction with the accompanying drawings.

BRIEF DESCRIPTION OF THE DRAWINGS

FIG. 2 is a table showing a recording power value saved by an initial recording power value setting part 106;

DETAILED DESCRIPTION OF THE PREFERED EMBODIMENTS

Figure 1:
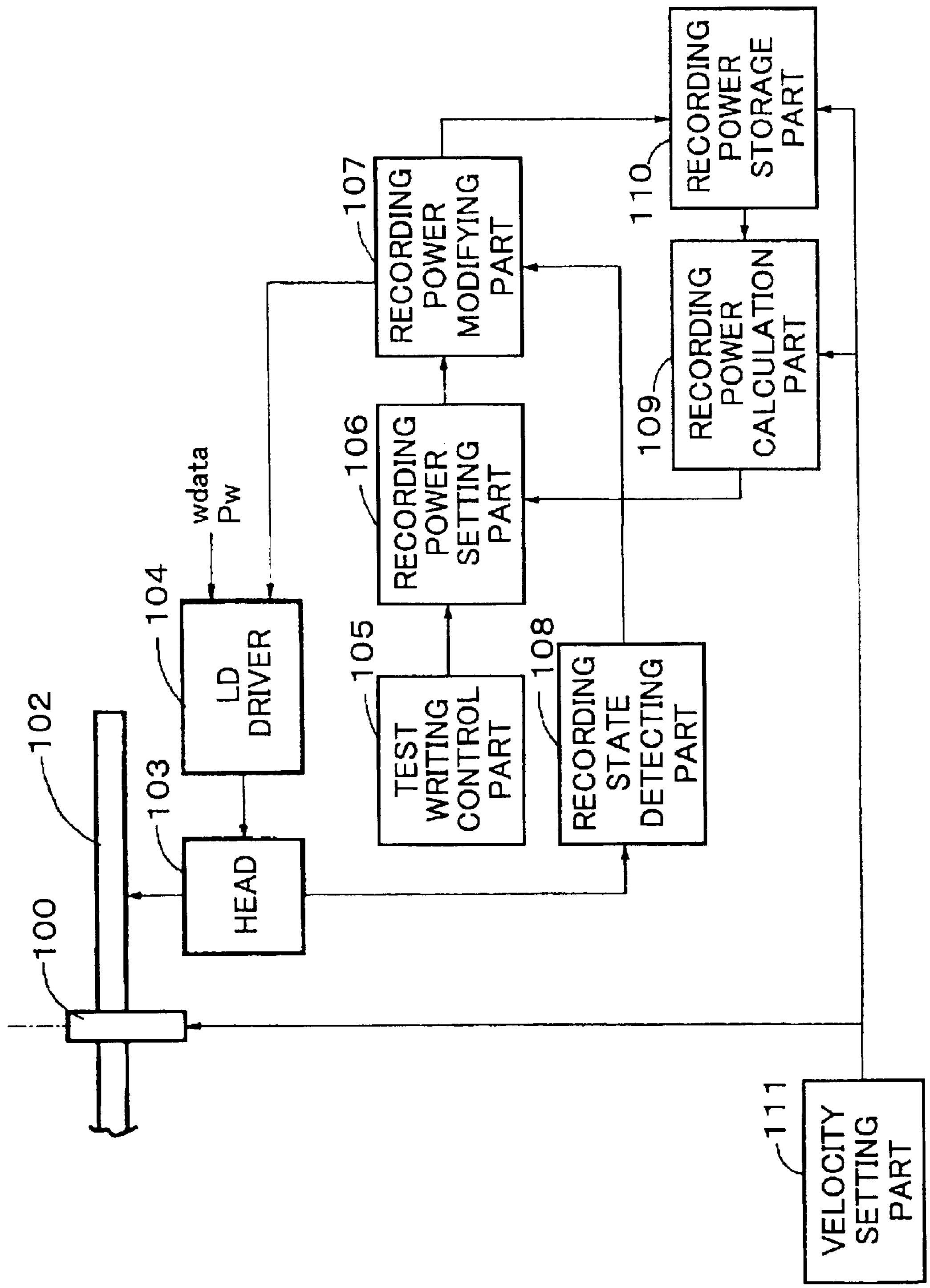
FIG. 1 is a block diagram showing one embodiment of an information recording apparatus of the present invention.

FIG. 1 is a block diagram showing one embodiment of an information recording apparatus of the present invention.

The information recording apparatus of the present invention is a CD-R drive, for example, and is controlled by a micro computer including a CPU, ROM, RAM, an input/output port and others, various mechanisms, and circuit parts. A program such as firmware that is installed in the ROM such as flash ROM is read into the RAM and implemented by the CPU, so that the present invention is realized.

The information recording apparatus of the present invention is showed by function blocks in FIG. 1. Information is recorded with a substantially constant linear density in a circumferential direction on an optical disk 102.

The optical disk 102 which is a recording medium having a disk shape such as a CD-R and others is rotationally driven by a rotating motor 100. A head 103 converges light beams on a recording layer of the optical disk 102 so as to form a record mark thereon. The head 103 is movable in the radial direction of the optical disk 102, and can access a test-writing area and a user data are a preliminarily provided on the optical disk 102.

A light source (not shown in FIG. 1) is mounted to the head 103. Normally, a semiconductor laser diode (LD) is used as the light source. This LD is modulated to a predetermined recording power state Pw by an LD driver 104 according to an input pulse w-data signal. The LD is modulated between the recording power state and a space power state so that the record marks and spaces are formed on the optical disk 102. When reproducing from this optical disk 102, a difference in reflectance occurs so that an information signal is reproduced.

A velocity setting part 111 provides the rotational motor 100 with a predetermined velocity. Simultaneously, information of a present recording linear velocity is provided to a recording power storage part 110 and a recording power calculation part 109 so as to store and calculate the recording power based on the linear velocity. Since a variable velocity recording control is implemented at the velocity setting part 111, the velocity setting part 111 functions as a means for controlling the variable linear velocity recording in cooperation with the following blocks.

A recording state detecting part 108 samples a regeneration signal obtained from the head 103 during writing at a predetermined timing so as to detect a value normalized by the recording power as a detected value (hereinafter value "B") of a recording state. The activation of the recording state detecting part 108 is showed in FIG. 5.

Figure 6:
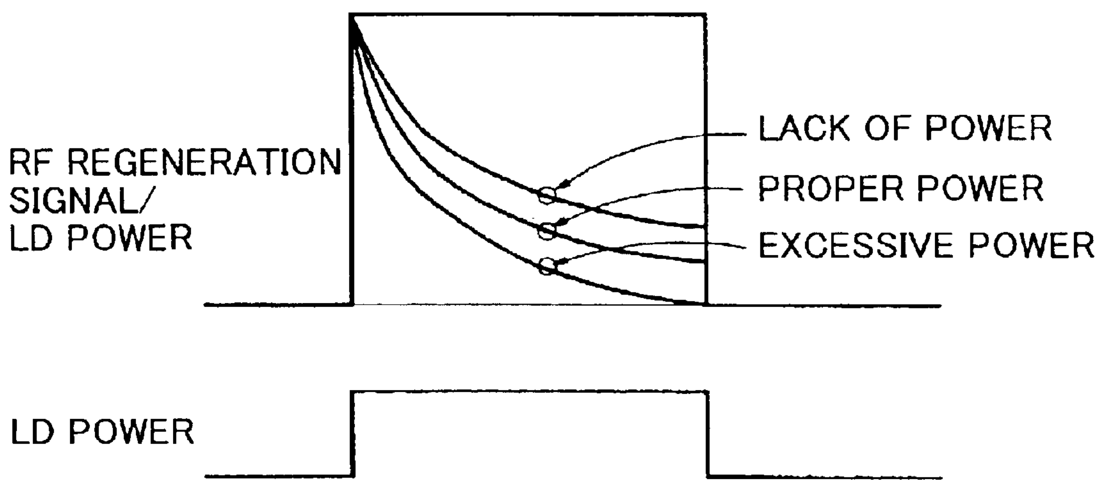
FIG. 6 is a view showing a relationship between a regeneration signal RF and LD power for explaining an action of the embodiment of the present invention.

FIG. 6 is a view showing a relationship between a regeneration signal RF and LD power for explaining an action of the embodiment of the present invention. As shown clearly in FIG. 6, a recording pulse is generated where the LD power has a high level. The regeneration signal RF is sampled at a predetermined timing (point ○) in a state where the LD power has a high level. Furthermore, the regeneration signal RF is divided (normalized) by the recording power in FIG. 6 in order to cancel a difference between regeneration light amount levels due to the power level.

As a result of this, the detected value (B) of the recording state has a high level in a case of lack of power because it is not sufficient to form the record mark (low reflection). The detected value (B) of the recording state has a low level in a case of excessive power because it is excessive for forming the record mark.

This value B is compared with a predetermined objective value at a recording power modifying part 107. The recording power modifying part 107 modifies the recording power based on a comparison result. That is, if the value B is smaller than a predetermined objective value, the power is excessive. Hence, in this case, the recording power is modified to be reduced. If the value B is larger than the predetermined objective value, the power is insufficient. Hence, in this case, the recording power is modified to be increased.

Because of the above mentioned modification, the recording power is controlled so that a recording state becomes proper. The above mentioned activation is the running OPC activation.

However, generally, the control velocity of the running OPC is not high. Hence, in the running OPC, it is not possible to respond immediately at the time of the beginning of recording. Therefore, it is necessary to set up some initial recording power value. This initial value is provided from a result of the test-writing (OPC).

A test-writing control part 105 performs test-writing at a designated area of the optical disk 102 by varying the recording power. The place where the test-writing is performed is regenerated (read) so that the regeneration signal is evaluated and a proper recording power value is obtained based on an evaluation result.

An initial recording power value setting part 106 sets an initial value of the recording power. A proper power value obtained by test-writing is related to the linear velocity in a state where test-writing is implemented. If recording is implemented with a different linear velocity than the test-writing, such as the CAV and the ZCLV, the recording power value is obtained by carrying out a calculation based on proportional linear velocities.

More specifically, if a proper power $P_{w0}$ is obtained in a case of a test-writing velocity $V_0$, a recording power $P_{w1}$ at another linear velocity $V_1$ can be calculated by the following formula (1).

$$P_{w1}=(V_1/V_0)\times P_{w0} \quad \text{[Formula (1)]}.$$

Of course, more complicated methods may be used for this operation.

The recording power storage part 110 saves the value of the recording power at the time of stopping recording (or finishing recording). At this time, the value of the recording power having a relationship with the linear velocity at the time of stopping recording is saved. The table of FIG. 2 shows a recording power value saved by the initial recording power value setting part 106. In this chart, the column of the recording power is blank when recording to the disk is still being performed. The value of the recording power is saved at the column of the recording power corresponding to the linear velocity at the time of stopping recording. According to an example shown in FIG. 2, recording is stopped for the linear velocities of 13× and 16×. The values of the recording power are 18 mW and 24 mW respectively for the linear velocities of 13× and 16×.

The recording power calculation part 109 calculates an initial value of recording power using the recording power saved at the recording power storage part 110 and the linear velocity at the time of starting recording and restarting recording. The recording power calculation part 109 provides the initial value of recording power to the initial recording power value setting part 106.

Therefore, as a principle, when additional recording is implemented from a position where recording is finished at a previous time (previous recording), recording starts in a state where the initial value of the recording power becomes the value of the recording power at the time of finishing of said previous recording. Hence, recording is implemented in the lowest recording state where the recording power does not change.

Figure 5:
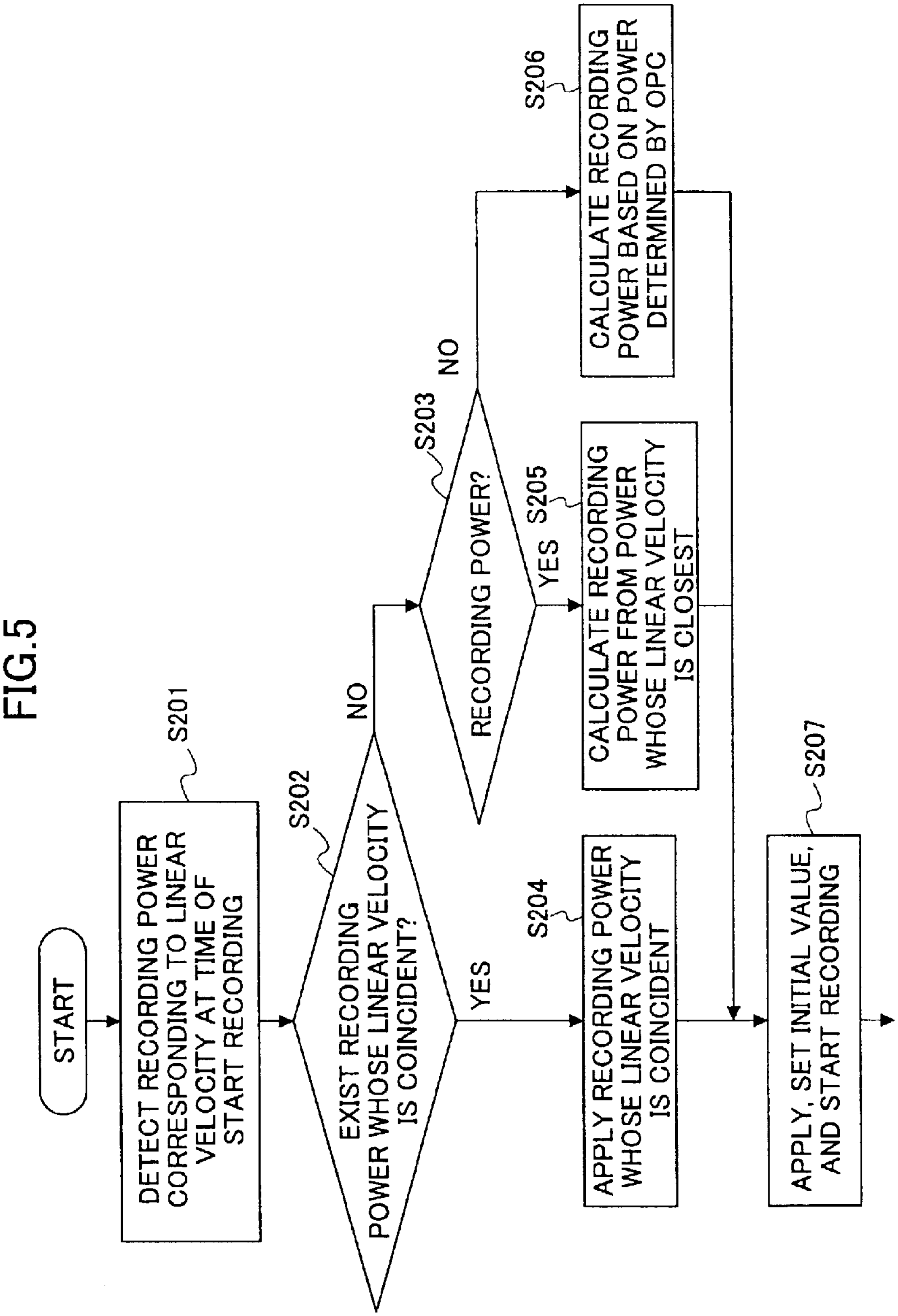
FIG. 5 is a flow chart for explaining an action of the embodiment of the present invention.

An algorithm at the recording power calculation part 109 follows the flow chart shown in FIG. 5. Referring to FIG. 5, a recording power saving chart that the recording power storage part 110 generates is searched for at step S201. That is, whether or not a recording power corresponding to a linear velocity being about to be recorded at exists, is searched for at step S201.

Whether or not a recording power whose linear velocity is coincident exists is determined at step S202. In a case where the recording power is saved, the recording power is applied at the step S204.

Figure 3:
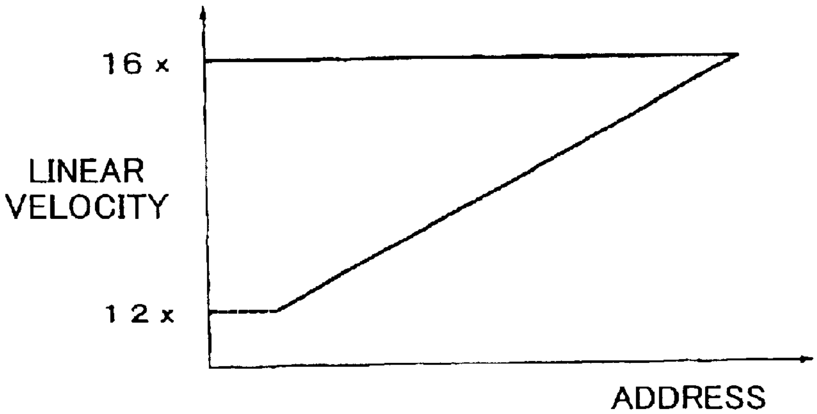
FIG. 3 is a graph showing a relationship between an address and a linear velocity for explaining an action of the embodiment of the present invention.

FIG. 3 is a graph showing a relationship between an address and a linear velocity for explaining an action of the embodiment of the present invention. Referring to FIG. 3, for example, in the CAV recording, recording starts at 12× (double velocity) and recording stops at 16×. In this case, as shown in FIG. 2, the recording power 24 mW is saved at the recording power saving chart stored in the recording power storage part 110. When additional writing is implemented at this position, the saved recording power 24 mW of 16× is applied at step S202.

If the recording power whose linear velocity is coincident does not exist, whether or not at least one recording power value is saved at the recording power saving chart is checked at the step S203. If at least one recording power value is saved at the recording power saving chart, the recording power corresponding to a linear velocity closest to the linear velocity being about to be recorded at this time is used and a proper operation is carried out with the linear velocity being about to be recorded at so that a necessary recording power is calculated.

For example, assuming that the linear velocity $V_2$ is in the column of the linear velocity of the recording power saving chart shown in FIG. 2 and the corresponding recording power $P_{w2}$ is in the column of the recording power of the recording power saving chart shown in FIG. 2, a recording power $P_{w3}$ can be calculated by the following formula (2) if the linear velocity at the time of starting recording is $V_3$.

$$P_{w3}=(V_3/V_2)\times P_{w2} \quad \text{[Formula (2)].}$$

Of course, more complicated methods may be used for this operation.

Thus, if recording is performed from a position different from a previous stopping position, there are a lot of situations where corresponding recording power values do not exist. Even in this case, if the recording power value saved in another position is used, a result in which a modification of the running OPC is reflected can be used rather than calculating based strictly on the result of the OPC so that a more proper initial value of the recording power can be obtained.

Lastly, if all of the columns of the recording power saving chart shown in FIG. 2 are blank, the recording power determined by the OPC and the recording power based on the linear velocity recorded this time are calculated at step S206. the same operation as the above described Formula (2) may be used to calculate the above mentioned recording powers. At step S207, the recording power applied from the recording power saving chart shown in FIG. 2 or calculated by the recording power calculation part 109 is provided to the initial recording power value setting part 106 so that an initial value of the recording power is set.

Figure 4:
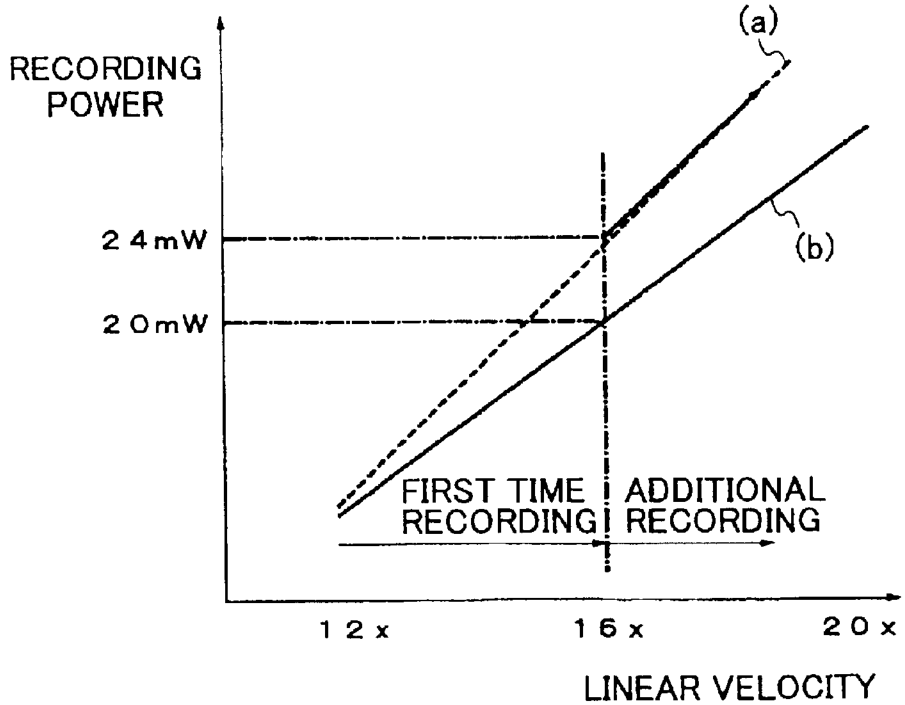
FIG. 4 is a graph showing a relationship between the linear velocity and the recording power for explaining an action of the embodiment of the present invention.

FIG. 4 is a graph showing a relationship between the linear velocity and the recording power for explaining an action of the embodiment of the present invention wherein the recording power is shown as a vertical axis and the linear velocity is shown as a horizontal axis.

FIG. 4 shows a modified example of the recording power in a case where recording starts at the inner periphery 12× and stops at the position of 16× and an additional recording is implemented from the position of 16×. A solid diagonal line (b) shows a recording power calculated corresponding to the linear velocity based on a result wherein the OPC is implemented at the position of 12×. A broken diagonal line (a) shows a recording power in a case where modification is continued to be implemented by the result of the running OPC.

When recording is stopped at the position of 16×, the recording power modified by the running OPC has a power of 24 mW and the recording power calculated by only the result of the OPC has a power of 20 mW. That is, there is a difference of 4 mW.

Therefore, if recording starts by the power of 20 mW calculated by only the result of the OPC, recording is implemented at an unsuitable recording power until the recording power is modified by the running OPC. On the other hand, in a case where the power of 24 mW of the recording power at the time of stopping recording is set as an initial value and the additional recording is implemented, the recording can be implemented with a proper recording power from the beginning.

Furthermore, when recording starts at a position close to the position where the OPC is implemented, even if the recording power exists in the recording power saving chart shown in FIG. 2, it is better to not use the recording power existing in the recording power saving chart shown in FIG. 2 but to use the recording power determined by the OPC.

For example, in a case of a writing method such as TAO (Track At Once) of CD, a TOC (Table Of Contents) area situated at the most inner periphery is written to after the user area is written to even at the outer periphery. In this case, if there is only one track, the recording power of the outer periphery where recording is stopped exists in the recording power saving chart shown in FIG. 2. However, this recording power is a result of the modification at an area of the outer periphery. Hence, it is not proper to use the recording power at the area of the inner periphery. Therefore, in this case, if the OPC is implemented at the most inner periphery, it is proper to use the result of the OPC.

In this case, as an algorithm, a determination box that diverges the process with "If the starting position of recording is in a range of a predetermined distance from the position of the OPC, go to step S206. If the starting position of recording is not in a range of a predetermined distance from the position of the OPC, go to step S202." may be inserted prior to step S202 in the flow chart shown in FIG. 5.

As described above, according to the present invention, it is possible to obtain the initial value of the recording power by using the result where a power just before stopping recording is modified, so as to provide a proper initial value of the recording power in a case of a short recording unit, CAV recording, or ZCLV recording and prevent the recording quality from deteriorating even partially.

The present invention is not limited to these embodiments, but variations and modifications may be made without departing from the scope of the present invention.

This patent application is based on Japanese priority patent application No. 2001-276916 filed on Sep. 12, 2001, the entire contents of which are hereby incorporated by reference.

What claimed is:

1. An information recording apparatus that records information with a substantially constant linear density in a circumferential direction of a recording medium having a disk shape, comprising:

variable velocity recording control means for recording the information by a different linear velocity in a radial direction of the recording medium;

recording power modification means for comparing a predetermined objective value of a recording state with a value corresponding to a generation signal from the recording medium and modifying a recording power value based on a result of the comparison if necessary, while the information is being recorded to the recording medium;

recording power storage means for storing the recording power value just-before stopping recording that is modified by the recording power modification means, with reference to the linear velocity, when recording is stopped; and initial recording power value setting means for setting an initial value of the recording power of the recording power modification means based on the linear velocity and the recording power value stored by the recording power storage means.

2. The information recording apparatus, as claimed in claim 1, wherein the initial recording power value setting means, at a time of recording being restarted, in a case where a recording power with reference to substantially equal linear velocity to a recording linear velocity is stored at the recording power storage means, sets the recording power as an initial value, and in a case where the recording power with reference to substantially equal linear velocity to the recording linear velocity is not stored but a recording power with reference to a different linear velocity than the recording linear velocity is stored at the recording power storage means, calculates and sets an initial value of the recording power by carrying out a predetermined operation with the recording power stored at the recording power storage means and the recording linear velocity through recording power calculation means.

3. The information recording apparatus, as claimed in claim 1, wherein the recording power calculation means calculates a recording power $P_{w3}$ by carrying out an operation of $P_{w3}=(V_3/V_2)\times P_{w2}$ where the recording power with reference to the recording linear velocity V2 stored at the recording power storage means is defined as $P_{w2}$ and a linear velocity at the time of starting recording is defined as $V_3$, and provides the recording power $P_{w3}$ to the initial recording power value setting means.

4. The information recording apparatus, as claimed in claim 2, further comprising a test-writing control means for implementing test-writing at a predetermined recording linear velocity so that a proper recording power corresponding to the recording linear velocity is obtained, and wherein the initial value of the recording power setting means, at the time of recording being restarted, in a case where the recording power with reference to substantially equal linear velocity to the recording linear velocity is not stored at the recording power storage means, sets an initial value of the recording power calculated by carrying out a predetermined operation with the proper recording power obtained by the test-writing control means and the linear velocity at the time of restarting recording, through the recording power calculation means.

5. The information recording apparatus as claimed in claim 4, wherein the initial recording power value setting means sets an initial value of the recording power calculated by carrying out a predetermined operation with the proper recording power obtained by the test-writing control means and the linear velocity at the time of restarting recording, through the recording power calculation means, in a case where a radius position at the time of restarting recording is in a range of the predetermined distance from a position where test-writing is implemented by the test-writing control means.

6. The information recording apparatus as claimed in claim 4, wherein the recording power calculation means calculates a recording power $P_{w1}$ by carrying out an operation of $P_{w1}=(V_1/V_0)\times P_{w0}$ where a proper recording power obtained by the test-writing control means is defined as $P_{w0}$ and a linear velocity at the time of restarting recording is defined as $V_1$, and provides the recording power $P_{w1}$ to the initial recording power value setting means.

7. An information recording method for recording information with a substantially constant linear density in a circumferential direction of a recording medium having a disk shape, comprising the steps of:

a) comparing a predetermined objective value of a recording state with a value corresponding to a generation signal from the recording medium and modifying a recording power based on a result of the comparison if necessary, while the information is being recorded to the recording medium by a different linear velocity in a radial direction of the recording medium;

b) storing a recording power value just-before stopping recording that is modified by recording power modification means, with reference to the linear velocity, when recording is stopped; and c) setting an initial value of a recording power of the recording power modification means based on the linear velocity and the recording power value stored by recording power storage means.

8. An information recording program for making an information recording apparatus implement the following process, comprising the steps of:

a) comparing a predetermined objective value of a recording state with a value corresponding to a generation signal from a recording medium having a disk shape and modifying a recording power based on a result of the comparison if necessary, while the information is being recorded to the recording medium with a substantially constant linear density in a circumferential direction of the recording medium at a linear velocity differing in a radial direction of the recording medium;

b) storing a recording power value just-before stopping recording that is modified by recording power modification means, with reference to the linear velocity, when recording is stopped; and c) setting an initial value of a recording power of the recording power modification means based on the linear velocity and the recording power value stored by recording power storage means.

9. A recording medium that can be read and written to by a computer, wherein an information recording program for making an information recording apparatus implement the following process is recorded, the information recording program comprising the steps of:

a) comparing a predetermined objective value of a recording state with a value corresponding to a generation signal from a recording medium having a disk shape and modifying a recording power based on a result of the comparison if necessary, while the information is being recorded to the recording medium with a substantially constant linear density in a circumferential direction of the recording medium at a linear velocity differing in a radial direction of the recording medium;

b) storing a recording power value just-before stopping recording that is modified by recording power modification means, with reference to the linear velocity, when recording is stopped; and c) setting an initial value of a recording power of the recording power modification means based on the linear velocity and the recording power value stored by recording power storage means.

10. Circuit parts implementing an information recording program comprising the steps of:

a) comparing a predetermined objective value of a recording state with a value corresponding to a generation signal from a recording medium having a disk shape and modifying a recording power based on a result of the comparison if necessary, while the information is being recorded to the recording medium with a substantially constant linear density in a circumferential direction of the recording medium at a linear velocity differing in a radial direction of the recording medium;

b) storing a recording power value just-before stopping recording that is modified by recording power modification means, with reference to the linear velocity, when recording is stopped; and c) setting an initial value of a recording power of the recording power modification means based on the linear velocity and the recording power value stored by recording power storage means.

* * * * *